Oct. 9, 1945.　　　R. C. ZEIDLER　　　2,386,285
FLUID COUPLING
Filed July 24, 1941
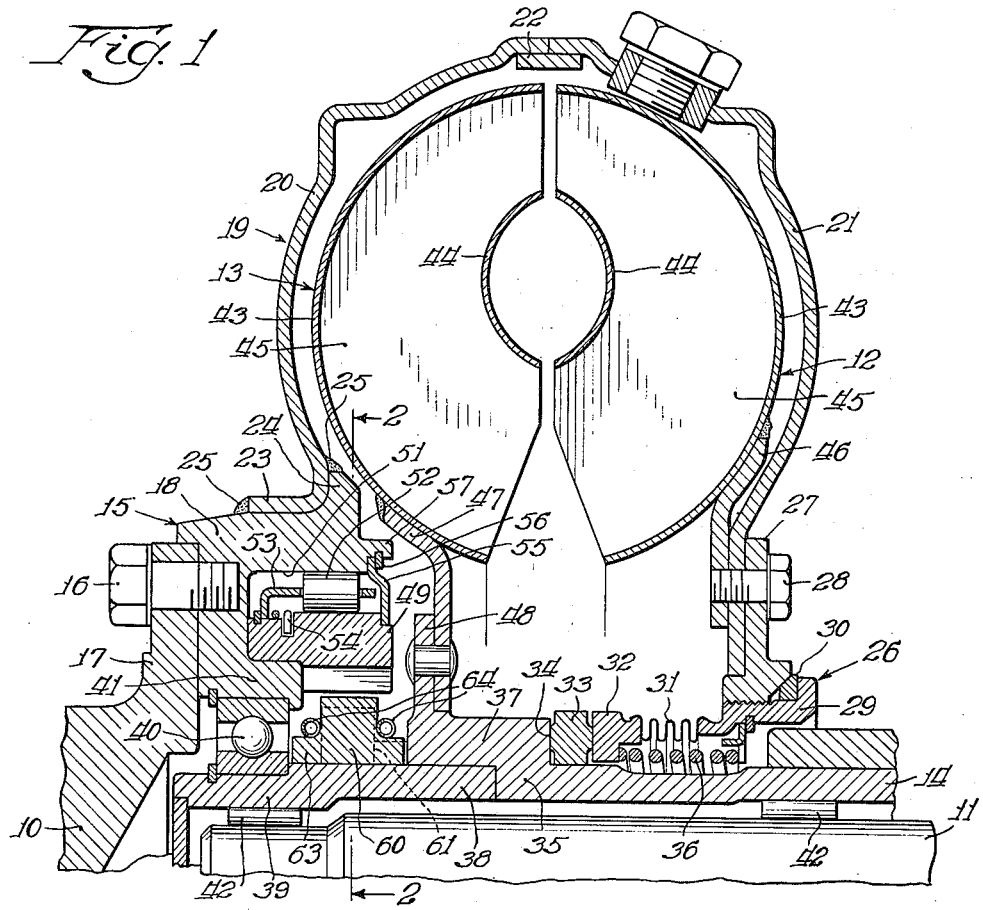
Fig. 1
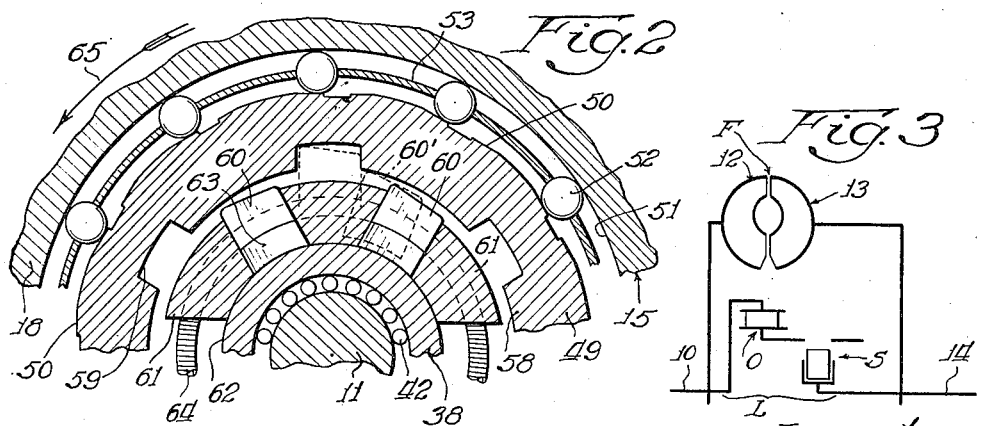
Fig. 2
Fig. 3
Inventor:
Reinhold C. Zeidler
By Edward C. Gritzbaugh
Atty.

Patented Oct. 9, 1945

2,386,285

UNITED STATES PATENT OFFICE 2,386,285

FLUID COUPLING

Reinhold C. Zeidler, Detroit, Mich., assignor to Borg-Warner Corporation, Chicago, Ill., a corporation of Illinois Application July 24, 1941, Serial No. 403,841

25 Claims. (Cl. 192—3.2)

This invention relates to hydraulic torque transmitting devices and has as its general object to provide a fluid drive mechanism having positive drive means to lock out the fluid drive at speeds above a predetermined point.

Another object of the invention is to provide a fluid drive mechanism particularly adapted for use in connection with a semi-automatic transmission of the type in which an automatic shift from starting gear to direct drive is effected by accelerator manipulation, and which is adapted to respond to the same accelerator manipulation to effect the lock-up simultaneously with the establishment of direct drive.

Another object of the invention is to provide a fluid drive mechanism of the character indicated, in which the shock of establishing the lock-up is cushioned by the fluid drive i. e. in which the fluid drive takes the reverse torque reaction developed in the establishment of the positive drive.

A further object of the invention is to provide a fluid drive which in addition to the above named characteristics, provides a positive drive which is of the free-wheeling type and yet substantially eliminates the "back lash feeling" inherent in the conventional free-wheeling drive, and at the same time permits the braking effect of the engine to be at least partially utilized at all times.

A still further object of the invention is to provide a fluid drive of the character indicated, which is adapted to eliminate transmission rattles.

Another object of the invention is to provide a fluid drive having a positive lock-up which will be released without fail whenever a reversal of torque takes place at a speed below the critical lock-up speed.

Other objects, the advantages and uses of the invention will become more apparent after reading the following specification and claims, and after consideration of the drawing forming a part of the specification, wherein:

Fig. 1 is an axial sectional view of a fluid coupling embodying the invention;

Fig. 2 is a transverse sectional view thereof taken as indicated by the line 2—2 of Fig. 1; and Fig. 3 is a schematic illustration of the power circuit.

As an example of one form in which the invention may be embodied, I have shown in the drawing a fluid coupling adapted to be interposed between the crank shaft 10 and the transmission drive shaft 11 of a motor vehicle. Such fluid coupling comprises, in general, an impeller 12 connected to the crank shaft 10 and a runner 13 which is mounted upon an intermediate, tubular shaft 14. The shaft 14 is adapted to drive the shaft 11 through the medium of a friction clutch (not shown). In the fluid coupling assembly comprising the invention, the shaft 14 may be considered as the driven shaft.

The impeller 12 and runner 13 cooperate to provide a fluid drive between the shafts 10 and 14, such fluid drive being indicated at F in the schematic showing of Fig. 3.

The invention provides a positive lock-up drive L bridging the fluid drive F, i. e. in parallel therewith, as clearly shown in Fig. 3. The positive lock-up drive L comprises a speed responsive clutch S and an overrunning clutch O arranged in series between the shafts 10 and 14.

The overrunning clutch O is adapted to transmit forward drive from the shaft 10 to the speed-responsive clutch S and to release under a reversal of this drive. The overrunning action of the clutch O permits the fluid drive F to cushion the engagement of the speed-responsive clutch S and also functions to facilitate release of the speed-responsive clutch S as will be pointed out more in detail hereinafter.

In detailed construction, the fluid coupling illustrated includes a hub member 15 demountably secured by means of cap screws 16 to a mounting flange 17 on the crank shaft 10. The hub 15 is formed with a cylindrical peripheral flange 18 on which is mounted the fluid housing 19. The housing 19 comprises two sections 20 and 21 secured together at the periphery by a connecting ring 22. The section 20 has a cylindrical flange 23 fitted on the periphery of the hub flange 18, positioned against a shoulder 24 on the flange 18, and welded to the hub at two places as at 25, 25.

The housing section 21 is sealed to the shaft 14 by means of a seal 26. Said seal 26 is supported from section 21 by a flange portion 27 detachably secured to the housing section 21 by cap screws 28, a nut 29 threaded into the flange 27 and sealed thereto by a packing ring 30. The seal proper comprises a bellows 31 secured at one end to the nut 29, a sealing ring 32 secured to the other end of the bellows 31, and a sealing washer 33 which is engaged between the sealing ring 32 and a shoulder 34 formed by an offset 35 in the shaft 14. A spring 36 urges the sealing ring 32 against the washer 33.

Beyond the offset 35, the shaft 14 is formed with an enlarged portion 37 into which is pressed a bushing 38 having a reduced end 39 piloted by means of a bearing 40 in an inner flange 41 formed on the hub 15. The bushing 38 forms an extension of and rotates with the shaft 14. The shaft 11 is journalled within the shaft 14 by means of roller bearings 42.

The impeller 12 and runner 13 are of conventional construction, each including outer and inner semi-toroidal shells 43 and 44 connected by radial vanes 45. The impeller 12 is mounted on a ring 46 detachably secured to the housing section 21 by the cap screws 28, and the runner 13 is mounted on a ring 47 secured to a radial flange 48 formed on the shaft 14 at the end of the enlarged portion 37 thereof.

The present invention provides, in combination with the features above described, the positive lock-up mechanism L, which includes an annulus 49 common to both of the clutches O and S. On the periphery of the annulus 49 are formed the cam elements 50 of the overrunning clutch O. The hub flange 18 has a cylindrical inner wall 51 forming the outer member of the overrunning clutch. Clutch rollers 52 are engaged between the wall 51 and the cam elements 50. A cage 53, acting under the pull of a torsion spring 54 one end of which is connected to the cage and the other end of which is anchored in the annulus 49, serves to constantly bias the rollers in a counter-clockwise direction as viewed in Fig. 2, thus maintaining the overrunning clutch at all times set for forward drive from the hub 15 to the annulus 49.

The annulus 49 is journalled on the periphery of the inner flange 41 of the hub 15, and is confined against axial movement by a washer 55 detachably secured to the hub 15 by a snap ring 56 in a shoulder 57 formed on the hub.

The interior of the annulus 49 is formed with a plurality of jaws 58 forming the outer member of the speed responsive clutch S. The jaws 58 define notches 59 in which centrifugal pawls 60 are adapted to engage. The inner member of the speed-responsive clutch S is formed by the shaft 14, the latter having a plurality of lugs 61 defining recesses 62 in which the pawls 60 are mounted for radial movement. The pawls 60 at their inner extremities are formed with axially extending arms 63 which are engaged by garter springs 64 functioning to yieldingly bias the pawls to their retracted, inoperative positions at speeds below the critical speed at which they are designed to function as a clutch. The garter springs are accommodated in the spaces between the lugs 61 and the bearing 40 on the one hand and the end of the enlarged portion 37 of the shaft 14 on the other hand.

The outer ends of the pawls 60 are cammed so as to effect ratcheting of the pawls against the jaws 58 when the annulus 49 is rotating faster than the shaft 14 at a speed above the critical speed of clutch engagement.

In operation, the fluid coupling of my invention is adapted to provide a fluid drive in the starting range of speeds, thereby securing the advantages of an automatic, cushioned engagement between the driving and driven members in the transmission of torque in such starting range. While the fluid drive is in operation, the annulus 49 will rotate as a unit with the hub 15, the torsion spring 54 maintaining the rollers 52 in contact with the annulus 49 and wedging the rollers against the cylindrical wall 51, as shown in Fig. 2. At the same time, the centrifugal jaws 60 will be restrained by the garter springs 64 in their retracted positions shown in full lines in Fig. 2.

When the critical lock-up speed has been exceeded, the centrifugal force developed in pawls 60 will exceed the restraining force of the springs and the pawls 60 will move outwardly to the position indicated in dotted lines at 60' in Fig. 2, where they will ratchet against the inner surfaces of the jaws 58 of the annulus 40. Such ratcheting will occur as a result of the slippage taking place between the driving and driven shafts as long as the drive is through the fluid, the driving assembly, including the annulus 49, rotating ahead of the driven assembly including the centrifugal pawls 60, in the direction indicated by the arrow 65 in Fig. 2.

The lock-up drive may now be established at any time after the critical lock-up speed has been exceeded by reversing the torque. Such reversal may be accomplished by decelerating the engine, for example, by releasing the accelerator, and consequently slowing down the driving member. As the driven member commences to rotate ahead of the driving member as a result of such reversal of torque, the centrifugal pawls will move outwardly into the notches 59 in the annulus 49, which continues to rotate with the driving assembly until such engagement of the centrifugal pawls in the notches 59 takes place.

In the absence of the overrunning clutch, the continued deceleration of the driving assembly resulting from the braking action produced by the compression in the engine, would produce what may be termed a reverse torque shock under the engagement of the centrifugal pawls with the jaws 58. The overrunning clutch O eliminates this reverse torque shock by releasing the annulus 49, and permitting it to rotate with the driven assembly. The only resistance to the reverse torque load then will be the reverse drive through the fluid. Thus the fluid drive permits the overrunning clutch O to operate so as to eliminate the reverse torque shock. Furthermore, since the fluid drive is constantly effective between the shafts, although reduced to a coasting drive at synchronization, it will cushion the release of the overrunning clutch by resisting the overrunning action, thus eliminating any "backlash feeling" which might arise in the release of the overrunning clutch and the re-engagement thereof upon the resumption of the forward power flow from the engine.

The mechanism provides a limited amount of free-wheel action while the centrifugal clutch remains in engagement. Such free-wheeling is of a modified type as compared to that of a conventional free-wheeling transmission, since it is opposed by the reverse drive through the fluid coupling and permits only such difference in speed between the driving and driven members as is provided by the slip in the coupling at such speed. It has the advantage, however, of eliminating transmission rattles which in a six cylinder automobile are apt to be troublesome in coasting from speeds of 55 down to 35 miles per hour. Transmission rattles which often develop at low speed are of course, eliminated by driving through the fluid in the starting range.

The free-wheeling drive is of such a character that the braking effect of the engine may be employed in coasting down inclines. A particular advantage of the arrangement is that the faster the coasting speed becomes, the greater will be the transmission of braking effort through the fluid drive, since the braking effort will increase with speed up to the stall speed of the coupling, and the differential between the speed of rotation of the engine and of the transmission will consequently tend to decrease.

Where the vehicle is permitted to coast down to a point below the critical lock-up speed, the centrifugal clutch S will automatically release as a result of the functioning of the overrunning clutch. In the absence of the overrunning clutch, the coast load acting between the driving and driven members of the centrifugal clutch would be sufficient to prevent retraction of the centrifugal pawls until engine idle speed had been reached. In such a case, if the accelerator were quickly depressed, the driving torque would probably catch the jaws before they could retract and the mechanism would then transmit positive drive instead of fluid drive at a low speed where fluid drive is desirable. In the arrangement of my invention, however, the coast load is taken through the fluid drive and there is no coast load transmitted through the centrifugal clutch. Accordingly, the centrifugal clutch may release at any time below the critical speed.

While the positive drive mechanism has been illustrated as being located forwardly of the runner between the running assembly and the driving hub, it is contemplated that this positive drive mechanism may be located at any convenient point between the driving and driven members of the hydraulic coupling.

I claim:

1. In a mechanism for transmitting torque from a driving to a driven member, means for establishing a fluid drive between said members, means for establishing a positive drive from said driving member to said driven member along a path parallel to the path of said fluid drive, said positive drive means comprising a positive clutch and a one way clutch in series.

2. In a mechanism for transmitting torque from a driving to a driven member, means for establishing a fluid drive between said members, means for establishing a positive drive from said driving member to said driven member along a path parallel to the path of said fluid drive, said positive drive means comprising a positive clutch and an overrunning roller clutch in series.

3. In a hydraulic torque transmitting mechanism, a driving assembly including a fluid driving element, a driven assembly including a fluid driven element cooperable with said driving element to establish a fluid drive, and means for establishing a positive drive from said driving assembly to said driven assembly bridging said fluid drive, said means comprising a positive clutch and a one way clutch interposed in series between said assemblies, said one way clutch facilitating engagement and disengagement of said positive clutch.

4. In a mechanism for transmitting torque from a driving to a driven member, means for establishing a fluid drive between said members, means for establishing a positive drive from said driving member to said driven member along a path parallel to the path of said fluid drive, said positive drive means comprising a positive clutch and a one way clutch interposed in series between said members.

5. In a mechanism for transmitting torque from a driving to a driven member, means for establishing a fluid drive between said members, means for establishing a positive drive from said driving member to said driven member along a path parallel to the path of said fluid drive, said positive drive means comprising a speed responsive positive clutch and a one way clutch in series.

6. In a mechanism for transmitting torque from a driving to a driven member, means for establishing a fluid drive between said members, means for establishing a positive drive from said driving member to said driven member along a path parallel to the path of said fluid drive, said positive drive means comprising a speed responsive positive clutch and an overrunning roller clutch in series, one within the other.

7. A torque transmitting mechanism as defined in claim 6, wherein said positive drive means includes an annular member the interior of which is formed to provide an annular element of one of said clutches and the periphery of which is formed to provide an annular element of the other of said clutches.

8. A torque transmitting mechanism as defined in claim 6, wherein said positive clutch is within said overrunning clutch.

9. A torque transmitting mechanism as defined in claim 6, wherein said positive drive means includes an annular member the interior of which is formed with an element of said positive clutch and the exterior of which is formed to provide the cam member of said overrunning clutch.

10. In a hydraulic torque transmitting mechanism, a driving assembly including an impeller, a driven assembly including a runner, and means for establishing a positive drive from said driving assembly to said driven assembly bridging the fluid drive between said impeller and runner, said means comprising a positive clutch and a one-way clutch to facilitate engagement and disengagement of said positive clutch while said assemblies are rotating asynchronously.

11. In a hydraulic torque transmitting mechanism, a driving assembly including an impeller, a driven assembly including a runner, and means for establishing a positive drive from said driving assembly to said driven assembly bridging the fluid drive between said impeller and runner, said means comprising a positive clutch and a one way clutch in series.

12. In a hydraulic torque transmitting mechanism, a driving assembly including a housing and an impeller, a driven assembly including a shaft and a runner mounted thereon and adapted to coact with said impeller to establish a fluid drive between said assemblies, and means for establishing a positive drive from said driving assembly to said driven assembly bridging said fluid drive, said means comprising an overrunning roller clutch and a centrifugal positive clutch interposed in series between said driving assembly and said driven shaft within said housing.

13. A torque transmitting mechanism as defined in claim 10, wherein said clutches include a common annular member formed on its periphery with an annular member of one of said clutches and in its interior with the annular member of the other of said clutches.

14. A torque transmitting member as defined in claim 12, wherein said clutches include a common annular member formed on its periphery with the cam member of said overrunning clutch and in its interior with a pawl receiving recess, and a centrifugal force responsive pawl drivingly connected to said driven shaft and radially projectible into said recess for coupling engagement with said common member.

15. A torque transmitting member as defined in claim 12, wherein said clutches include a common annular member formed on its periphery with the cam member of said overrunning clutch and in its interior with a pawl receiving recess, said driven shaft being formed with a pawl carrier, and a centrifugal force responsive pawl mounted in said carrier for projection into said recess.

16. A torque transmitting mechanism as defined in claim 6, wherein said positive and overrunning clutches include a centrifugal force responsive positive clutch jaw drivingly connected to said driven member, an annular member common to both of said clutches, formed in its interior with means for coupling with said jaw and in its periphery with the cam member of said overrunning clutch, an overrunning clutch housing rotating with said driving member, and clutch rollers interposed between said cam member and housing.

17. In a hydraulic torque transmitting mechanism, a driving assembly including a hub portion, a housing and impeller carried thereby, a driven assembly including a shaft extending into said housing and a runner carried by said shaft and adapted to coact with said impeller for establishing a fluid drive between said assemblies, means for establishing a positive drive from said driving assembly to said driven assembly bridging said fluid drive, said means comprising an overrunning roller clutch and a centrifugal positive clutch interposed in series between said hub portion and said driven shaft within said housing, said hub portion being formed with a cylindrical flange constituting the outer member of said overrunning clutch.

18. A torque transmitting mechanism as defined in claim 17, wherein said driven shaft is extended through said positive clutch and piloted in a bearing mounted in said hub portion and wherein said clutches are disposed between said bearing and said runner within the space circumscribed by said flange.

19. A torque transmitting mechanism as defined in claim 17, wherein said shaft is formed with a radial flange on which said runner is mounted, said clutches being disposed between said hub portion and said radial flange, in a space circumscribed by said cylindrical flange.

20. In a hydraulic torque transmitting mechanism, a driving assembly including a hub portion, a housing and impeller carried thereby, a driven assembly including a shaft extending into said housing and a runner carried by said shaft and adapted to coact with said impeller for establishing a fluid drive between said assemblies, means for establishing a positive drive from said driving assembly to said driven assembly bridging said fluid drive, said means comprising an over-running roller clutch and a centrifugal positive clutch interposed in series between said hub portion and said driven shaft within said housing, said shaft being formed with a radial flange on which said runner is mounted, and with a pawl slideway portion projecting from said flange toward said hub portion and terminating in a pilot portion, a bearing mounted in said hub portion, in which said pilot portion is journalled, a centrifugal force responsive pawl mounted in said slideway portion and axially confined between said flange and said bearing.

21. A torque transmitting mechanism as defined in claim 20, wherein there are a plurality of pawls, each having axially extending arms formed at their radially inner extremities, and means for yieldingly restraining said pawls in their retracted positions at low speeds, said means comprising a pair of garter springs engaged against said arms.

22. In a hydraulic torque transmitting mechanism, a driving assembly including a drive shaft, a hub ring detachably secured to said drive shaft, a toroidal housing mounted on the periphery of said hub ring, and an impeller mounted in said housing on the side thereof remote from said hub ring; a driven assembly including a driven shaft extending into said housing through said remote side and sealed thereto and a runner mounted on said shaft adjacent said hub ring and coacting with said impeller to provide a fluid drive between said shafts; means to establish a positive drive from said driving assembly to said driven assembly bridging said fluid drive, said means comprising an overrunning roller clutch and a centrifugal positive clutch interposed in series between said shafts, one within the other in the space between said runner and said hub ring.

23. A hydraulic transmitting mechanism as defined in claim 22, wherein said clutches include a common intermediate member in the form of an annulus having its periphery and its interior respectively formed with an annular element of each of said clutches, said hub ring and shaft being formed with the other annular elements of said clutches, and clutch rollers and a centrifugal pawl interposed between said annular elements.

24. A hydraulic transmitting mechanism as defined in claim 22, wherein said clutches include a common intermediate member in the form of an annulus having its periphery formed to constitute the cam member of said roller clutch and its interior being formed with an element of said positive clutch, said hub ring constituting the outer member of said overrunning clutch, said shaft having a portion constituting a pawl carrier, a centrifugal pawl mounted in said cam for movement outwardly into engagement with said positive clutch element, and clutch rollers interposed between said cam and outer member of the overrunning clutch.

25. A hydraulic transmitting mechanism as defined in claim 22, wherein said clutches include a common intermediate member in the form of an annulus having its periphery formed to constitute the cam member of said roller clutch and its interior being formed with an element of said positive clutch, said hub ring having a cylindrical flange constituting the outer member of said overrunning clutch, said shaft having a portion constituting a pawl carrier, a centrifugal pawl mounted in said cam for movement outwardly into engagement with said positive clutch element, and clutch rollers interposed between said cam and outer member of the overrunning clutch, said driven shaft having an enlargement to which said runner is secured and being extended beyond said pawl carrier portion to form a pilot trunion, and a bearing mounted in said hub ring, in which said trunnion is journalled, said pawl being confined axially between said bearing and said shaft enlargement.

REINHOLD C. ZEIDLER.